Figure 1:
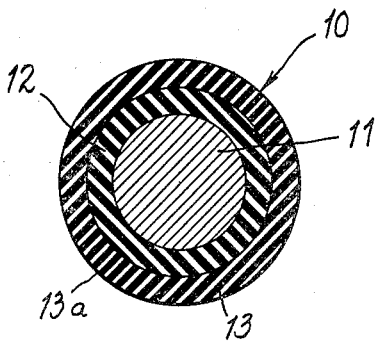

May 3, 1960   R. HALL ET AL   2,935,427
FRICTION MAGNET WIRE
Filed Oct. 10, 1956

INVENTORS.
RALPH HALL
EARL L. SMITH
BY   GEORGE D. HILKER

ATTORNEYS.

2,935,427

FRICTION MAGNET WIRE

Ralph Hall, Earl L. Smith, and George D. Hilker, Fort Wayne, Ind., assignors to Phelps Dodge Copper Products Corporation, Fort Wayne, Ind., a corporation of Delaware Application October 10, 1956, Serial No. 615,174

4 Claims. (Cl. 117—218)

This invention relates to insulated electrical conductors of the so-called magnet wire type and has particular reference to a novel insulated conductor of this type having an outer film coating of high frictional characteristics for coil winding, and the like, whereby the desired winding form can be maintained due to the inherent frictional characteristic of the insulation.

In the manufacture of electrical coils, particularly those used in large volume in radio, television and other electronic applications, it is desirable to wind quickly and economically a coil of the lattice type commonly identified as a universal-wound or basket-weave. Basically, the wire is wound with a rapid traverse going from one side of the coil to the other side of the coil in approximately 180° rotation of the coil. Although magnet wires provided with conventional film insulation such as "Formvar," enamel, "Sodereze," nylon, etc., have been used in some of the simpler of these applications, it has generally been necessary to add adhesive during winding to hold the wire in place. For the more complicated higher pile coils, such as those identified as "flybacks" in television sets, it has been necessary to use a wire insulation including a textile, such as silk, nylon or other fibrous materials which give the wire surface sufficient friction or "grip" to prevent the coil from falling apart during winding.

The disadvantages of the conventional wires for winding universal lattice coils have been the high cost of the textile-insulated wires, coupled with their poor electrical characteristics, and the unreliability and inconvenience of the adhesive method used for film-insulated wires. The use of fabric-covered wires, because of their high cost, has necessitated redesign of many of these coils using the conventional layer-winding, paper-section technique, with resultant design disadvantages.

The principal object of the present invention is to provide a magnet wire which overcomes the above-noted disadvantages.

An insulated wire made according to the invention comprises a basic insulation in the form of one or more layers of a resinous film insulation, such as "Formvar," enamel, "Sodereze," nylon, etc., coated on the conductor, and a continuous outer film of a highly pigmented composition including a non-conducting resinous binder containing a pigment filler in an amount which is at least 30% by weight of the resin binder. The binder may be any conventional film type of insulation. Although various pigment fillers may be used, the filler is preferably selected from the group consisting of clay, metallic oxides, metallic silicates, amorphous silica, and metallic carbonates, and the filler preferably has a particle size of 0.5 to 50 microns. Because the amount of pigment present in the outer film is at least 30% by weight of the resin binder, the pigment gives the surface of this outer film a frictional characteristic which enables the wire to hold its position in a coil or other winding without resort to special measures for this purpose.

We are aware that it has been proposed heretofore to incorporate pigment fillers in organic compounds for insulating conductors. However, such fillers have been used heretofore in relatively small amounts sufficient only to color, extend or reinforce the organic insulating compound or to increase its heat or flow resistance or its durability, without appreciably affecting its electrical insulating characteristic. According to the present invention, the pigment filler is present in the outer film in a relatively large amount sufficient to impart a definite frictional characteristic, as previously described. Moreover, even if the nature and amount of the pigment tend to reduce the dielectric strength of the outer film, the insulating property of the underlying film of basic insulation is not affected by the pigment. Also, while the relatively high proportion of pigment in the outer film reduces its flexibility, this effect is counteracted by the flexible underlying film of basic insulation.

As previously mentioned, both the inner layer of basic film insulation and the resin binder of the outer friction film may be any of the conventional varnish or film type of insulating compounds. Among these compounds are polyvinyl formals such as those known in the trade as "Formvar" (described in Reissue Patent No. 20,430, dated June 29, 1937, Jackson and Hall Patent No. 2,307,-588, and an article entitled "The Manufacture, Properties and Uses of Polyvinyl Formal," by A. F. Fitzhugh et al., which appeared in the Journal of Electrochemical Society, vol. 100, No. 8, August 1953); the conventional adipic hexamethylene diamine polymer known as nylon; a mixture of resins based on isocyanate and conventionally called polyurethanes, which consists of the reaction of Mondur S (blocked isocyanate) with Multron R-2 (one of a group of di-acids plus polyols which provide varying ratios of free OH groups for cross-linking with the isocyanate) and other resins containing free OH or active hydrogen groups, known in the trade as "Sodereze"; and other insulating varnishes and enamels.

In the manufacture of the new magnet wire, the resinous basic insulation is applied to the conductor in a continuous film, preferably by dissolving it in a suitable solvent, coating the solution on the conductor (as by means of dies through which the conductor is drawn) and then baking the insulation on the conductor in a conventional enameling oven. It is usually desirable to apply several coatings of the resinous compound in this manner, so that the layer of basic insulation is made up of several continuous superimposed films on the conductor. The outer film, comprising the highly pigmented resinous binder, may be applied in the same manner as the film of basic insulation. The basic insulation provides a flexible support for the outer friction film and serves as the primary insulating medium.

The bare wire may be conveniently insulated, according to the invention, by stringing it in a conventional enameling oven to which the wire is fed through dies for applying the coatings of the basic insulation and frictional insulation in sequence, so that the wire passes from one die to the next by way of the oven where the coating from the previous die is baked or cured to a hard film. The basic insulation may be applied in several films from a series of such dies, and the final die, of course, applies the solution of the highly pigmented binder. If desired, the latter solution may be applied in two or more coatings from respective dies, so that the outer layer of frictional insulation is made up of multiple films of the highly pigmented binder. For example, the bare wire may be provided with eight coats applied in this manner, six of which are coats of the basic film insulation and the other two of which are coats of the highly pigmented binder.

The pigment, such as chrome oxide, titanium dioxide, or aluminum silicate, may be ground into the binder solution which is then applied as the outer coating or coatings of the insulated wire. Depending upon the degree of friction desired in the final wire, the amount of pigment filler incorporated in the resinous binder of the outer film may vary from 30% to 400% by weight of the resin binder. If the upper limit of this range is substantially exceeded, the outer film becomes too brittle for the usual purposes of magnet wire.

A specific example of the manufacture of the new magnet wire is as follows:

A solution of basic film insulation is made up comprising by weight 16% solids, consisting of 66⅔ parts of Formvar 1595E and 33⅓ parts of a "phenolic" identified as Monsanto's 455B and which is a cresol formaldehyde resin, as more fully described in U.S. Patent 2,307,588 of Jackson and Hall. The solvent may consist of conventional solvents, the most common of which is a mixture consisting of 30% cresylic acid (a mixture of coal tar cresols), and 70% NJ-100 (hydrogenated naphtha). Six coats of this solution are applied to a #31 AWG bare copper wire according to the conventional wire enameling procedure as previously described, wherein the enameling oven is at a temperature of 675–775° F. and the wire travels through the coating dies and through the oven at a rate of 52 feet per minute. The oven baking removes the solvents and cures each coating to a hard flexible film. To the surface of the wire thus insulated is applied a second solution or outer varnish coating consisting of the following:

*Outer varnish*

|  | Part/100/wt. |
|---|---|
| 15–95E Formvar resin (polyvinyl formal Shawinigan | 6.50 |
| Cresylic acid (mixed coal tar cresols) | 36.25 |
| NJ–100 (hydrogenated petroleum solvent) | 36.25 |
| Furfural (furfuraldehyde solvent) | 14.50 |
| Bentone–34 (alkydammonium bentonite) | 3.25 |
| ASP–400 (aluminum silicate pigment) | 3.25 |
|  | 100.00 |

The 15–95E Formvar is dissolved by agitation in part of the cresylic acid—NJ-100 mixture. The Bentone–34 and the ASP–400 are dispersed in the furfural and the remainder of the solvents and added to the Formvar solution. The resulting varnish has a solid content of 13% and the pigment to binder ratio is 1 to 1 with a viscosity of approximately 700 cps. at 30° C.

The average particle size of the pigment filler (Bentone–34 and ASP–400) is 5 microns.

Two coats of the outer varnish are applied over the basic film insulation on the wire, in the manner previously described and using the same oven temperature and wire speed. These two outer coats may be applied in the same run in which the underlying coats of basic insulation were applied, by arranging the wire to pass through the oven from each of two dies which apply the outer varnish, after baking of the final coat of basic insulation. The oven baking of each coat of outer varnish removes the solvents and cures the coat to a hard film which by reason of the highly pigmented vehicle or binder, has a roughened surface such that turns of the wire will frictionally hold their positions in coils.

Figure 2:
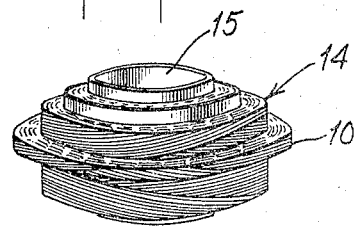

In the accompanying drawing:

Fig. 1 is a cross-sectional view, on an enlarged scale, of a magnet wire made in accordance with our invention, and Fig. 2 is a perspective view of a coil made from the magnet wire illustrated in Fig. 1.

Referring to Fig. 1, the magnet wire 10 there shown comprises a central copper conductor 11, a layer 12 of continuous film insulation coated on the conductor and forming the basic insulation, and a continuous outer film or layer 13 of the highly pigmented binder forming an exposed friction surface 13a. As shown in Fig. 2, the wire 10 is wound into a coil 14 of the universal wound type on a hollow cylindrical form 15, the wire turns holding their positions in the coil due to the inherent frictional characteristic of the outer surface 13a of the wire.

We claim:

1. A magnet wire adapted for winding in a coil, said wire comprising a conductor, a layer of resinous varnish on the conductor forming a continuous base insulation, and a continuous outer film of varnish coated on the base insulation and consisting essentially of a non-conducting resinous binder and a pigment filler in an amount which is between 30% and 400% by weight of the binder, the particle size of said pigment filler being from 0.5 to 50 microns, whereby said outer film has a surface of sufficient friction to hold the wire turns in position in the coil, said layer forming a flexible support for said outer film and serving as the primary insulating medium.

2. A magnet wire according to claim 1, in which the pigment filler is selected from the group consisting of clay, metallic oxides, metallic silicates, amorphous silica and metallic carbonates.

3. A magnet wire according to claim 1, in which said outer film consists essentially of approximately equal parts by weight of said binder and said filler.

4. In an electric coil of the universal wound type, a winding of magnet wire comprising a conductor, a layer of resinous film on the conductor forming a continuous base insulation, and a continuous outer film coated on the base insulation and consisting essentially of a non-conducting resinous binder and a pigment filler in an amount between 30% and 400% by weight of the binder, the particle size of said pigment filler being from 0.5 to 50 microns, whereby said outer film has a friction surface holding the wire turns in position in the coil, said layer forming a flexible support for said outer film and serving as the primary insulating medium.

References Cited in the file of this patent

UNITED STATES PATENTS

| 2,093,501 | Williams | Sept. 31, 1937 |
| 2,105,362 | Nowalk et al. | Jan. 11, 1938 |
| 2,480,298 | Happoldt | Aug. 30, 1949 |
| 2,484,705 | Gray | Oct. 11, 1949 |
| 2,523,999 | Sattler et al. | Sept. 26, 1950 |
| 2,694,650 | Herman et al. | Nov. 16, 1954 |
| 2,710,289 | Smith-Johanssen | June 7, 1955 |